Patented Dec. 4, 1951

2,577,198

UNITED STATES PATENT OFFICE 2,577,198

CHEMICAL COMPOSITIONS AND PROCESS FOR THE PREPARATION THEREOF

Willard H. Kirkpatrick, Sugar Land, Tex., assignor to Visco Products Company, Houston, Tex., a corporation of Delaware No Drawing. Application December 28, 1948, Serial No. 67,754

8 Claims. (Cl. 260—97.5)

This invention relates to new and useful chemical compositions and to a method for the preparation thereof.

One of the objects of the invention is to provide chemical compositions which are characterized by water wettable interfacial and surface-active properties.

Another object is to provide new and improved chemical compositions which are useful as demulsifiers or for other uses where surface-active characteristics are necessary or desirable.

Still a further object of the invention is to provide a new and improved process for producing chemical compositions of the type above described. Other objects will appear hereinafter.

In accordance with the invention new and useful chemical compositions are provided which are the products of the reaction of a polybasic acid and an intermediate molecularly dehydrated condensation product of an alkanolamine and a mixture of at least two dissimilar unsaturated carboxy acids wherein at least one of said acids is a carbocyclic resin acid and another of said acids is an acyclic acid having at least 8 and not more than 32 carbon atoms in an aliphatic chain, the quantity of the alkanolamine in said intermediate product being a 100% to 600% molar excess of that quantity theoretically required for the acylation of the hydroxyl groups contained in said alkanolamine by the acidic groups contained in said acids.

Of the two dissimilar carboxy acids required for the preparation of the intermediate acylated alkanolamine, the one is preferably an unsaturated long chain acyclic or fatty type carboxy acid having at least 8 carbon atoms and not more than 32 carbon atoms in the chain. This group of acids may also be called unsaturated detergent forming acids. As examples of acyclic type acids which I have found particularly suitable for my purpose I may mention: linolenic acid, linoleic acid, oleic acid, mixtures thereof and other commonly available unsaturated long chain acyclic acids. Certain of these acids, (e. g., linoleic acid and linolenic acid), may also be called drying oil acids. Satisfactory results have been obtained by the practice of the invention wherein the drying oil acids have been partially blown.

The other dissimilar type of carboxy acid required for my process is a carbocyclic carboxy acid of the terpene type, preferably a rosin acid. The most commonly available rosin acids are abietic acid and related derivatives derived from naval stores. Other oil soluble natural acidic resins, e. g., polymerized rosin, dehydrogenated rosin and cracked copals (for example, run Congo) may be employed.

The dissimilarity of these two types of carboxy acids is characterized by the acyclic type being a long chain carboxy acid, whereas the rosin type is a carbocyclic carboxy acid of the terpene type. In the practice of the present invention the weight ratio of the acyclic carboxy acid to the carbocyclic carboxy acid in the acylated alkanolamine is preferably within the range of 1:1 to 2:1, the lesser component always being in excess of about 30% of the total carboxy acids.

While any blend of the dissimilar acids can be prepared, my preferred mixture of dissimilar carboxy acids is readily obtainable as a naturally occurring mixture of dissimilar carboxy acids known in the trade as tall oil or tallol. Tall oil is the liquid resin obtained in digesting wood to wood pulp in the paper industry. It is a dark brown viscous liquid containing a crystalline sediment of abietic acid. From the results of several investigations the following principal constituents of tall oil are indicated: resin acids 30% to 45%, fatty acids 45% to 60%, unsaponifiable matter 6% to 12%. The unsaponifiable portion is a yellow viscous oil containing a waxy or pitchy material. The specifications of the particular grade of tall oil which I prefer to use is as follows:

| | |
|---|---|
| Specific gravity (at 15.5 degrees C.) | .9697 |
| Acid number | 164.0 |
| Saponification number | 173.6 |
| Ester number | 9.4 |
| Percent moisture | 0.0 |
| Percent rosin acids | 39.2 |
| Percent fatty acids (by difference) | 52.79 |
|     Percent linolenic acid, 19.25% | |
|     Percent linoleic acid, 10.5% | |
|     Percent oleic acid, 23.04% | |
| Unsaponifiable | 8.01% |
| Iodine number | 148.83 |
| Thiocyanogen — iodine number | 91.1 |
| Percent saturated fatty acids | None |
| Percent unsaturated fatty acids | 100% |
| Titer test | 5.5 degrees C. |
| Pour test | 4.4 degrees C. |
| Cloud test | 10–12.8 degrees C. |

Examples of suitable alkanolamines for my purpose are as follows: diethanolamine, octylethanolamine, cyclohexylethanolamine, benzylethanolamine, hydroxypropyldiethanolamine, triisopropanolamine, cyclohexyldiethanolamine, octadecyldiethanolamine, etc. Alkanolamines with ether linkages in the alkyl group are intended as functional equivalents. Products having demulsifying characteristics can be prepared from alkanolamines having at least two hydroxyl groups in the molecule but tertiary alkanolamines having three or more hydroxyl groups in the molecule are to be preferred.

My preferred alkanolamine is triethanolamine which is a viscous and very hygroscopic liquid which boils at 244 degrees C. at 50 mm. The commercial product which is used for the purpose of the invention contains not more than 2.5% monoethanolamine and not more than 15% diethanolamine and not less than 80% triethanolamine. The neutral equivalent of the commercial product will average about 140 and is entirely satisfactory for my purpose.

As examples of organic polybasic acids which are suitable for purposes of this invention, there can be mentioned: succinic, maleic, phthalic, terephthalic, citric, malic, adipic, oxalic, suberic, azelaic, diglycolic, and sebacic acids, and homologues thereof or their anhydrides.

The intermediate acylated alkanolamine is prepared by heating the alkanolamine and the dissimilar carboxy acids, wherein the alkanolamine is present in substantial molar excess, to elevated temperatures sufficiently high to facilitate the elimination of an aqueous distillate. This condensation reaction results in the elimination of large quantities of aqueous distillate. There is present substantial quantities of nitrogen bodies in the aqueous distillate. These may result from simple distillation of low boiling nitrogen bodies, originally present as impurities, or they may result from the distillation of low boiling nitrogen bodies formed during the condensation reaction in which alkanolamines having a plurality of ether linkages in the alkyl group are formed. The condensation is preferably carried out in the absence of any azeotropic solvent where products having demulsifying properties are desired for it has been found that the demulsifying characteristics are diminished when the aqueous distillate is removed as an azeotrope.

In the present invention, the preparation of the desired composition is carried out by condensing the polybasic acid with the intermediate acylated alkanolamine at moderate temperatures. Where the polybasic anhydrides are used the condensation reaction results in the opening of the anhydride linkage to yield a partial ester in which the carbonyl group has reacted with a hydroxyl group. Where polybasic acids are used higher temperatures must be employed in order to form the partial ester by reacting one carboxyl group and one hydroxyl group with the elimination of water. The resultant products will be complex reaction materials, the chemical constitution of which cannot be ascertained with any degree of accuracy.

The compositions I have prepared in accordance with the preparation described herein are strikingly and outstandingly different in certain properties, e. g., their emulsion resolving characteristics, from products where the alkanolamine is not used in excess in making the intermediate product and the elimination of water is stopped at a point comparable to complete acylation.

It is essential for the purposes of my invention that the alkanolamine be present in substantial molar excess as related to the dissimilar carboxy acids. Further, it is essential for the purposes of my invention that the condensation reaction proceed to the point where the aqueous distillate secured amounts to a substantial excess above the quantity required for theoretical acylation. In other words, the quantity of the alkanolamine should be such that there are hydroxyl groups present in excess of those required to react with the carboxyl groups of the carboxy acids in the intermediate acylation reaction. For example, one mol of the carboxy acids of tall oil and two mols of triethanolamine is considered 100% excess. One mol of the carboxy acids of tall oil and four mols of triethanolamine is considered 300% molar excess. It has been found that new and superior products can be prepared wherein the alkanolamine is present within the range of 100 to 600 per cent molar excess and the aqueous distillate removed from the condensation reaction is equivalent to 200 to 600 per cent of the quantity required for theoretical acylation.

In order to illustrate specifically the new types of materials contemplated for use in accordance with the present invention, the following examples are given. It is to be understood, however, that I do not confine myself to the specific chemicals, or proportions thereof, set forth in these examples as it will be obvious that equivalents of these chemicals and other proportions may be used without departing from the spirit of the invention or the scope of the appended claims. In the examples, the quantities are stated in parts by weight.

INTERMEDIATE EXAMPLE I

In a suitable reaction vessel provided with a means for removal of any aqueous distillate which forms, 714 parts of triethanolamine and 604 parts of tall oil were heated with stirring to 250 degrees C. The reaction mass was held at this temperature for 9 hours and an aqueous distillate was secured in accordance with the following log:

| Time | Temperature °C. | Parts Aqueous Distillate |
|---|---|---|
| 8:30 | 165 | Began |
| 9:45 | 250 | 57 |
| 11:45 | 250 | 129 |
| 1:00 | 250 | 154 |
| 5:00 | 257 | 190 |
| 6:45 | 252 | 199 |

The product at this stage was entirely too viscous for customary handling by the petroleum industry. Two hundred (200) parts of a suitable hydrocarbon vehicle such as SO₂ Extract was added to yield the finished product.

INTERMEDIATE EXAMPLE II

In a suitable reaction vessel provided with a means for removal of any aqueous distillate which forms, 600 parts of tall oil and 800 parts of a still residue secured from the commercial manufacture of triethanolamine was heated with stirring to secure an aqueous distillate in accordance with the following log:

| Time | Temperature °C. | Parts Aqueous Distillate |
|---|---|---|
| 9:25 | 144 | 4 |
| 11:10 | 231 | 70 |
| 1:45 | 250 | 138 |
| 2:00 | 250 | 140 |

It was determined that the removal of further quantities of aqueous distillate resulted in a rubbery-like mass which could not be further handled. To the above product from which 140 parts of aqueous distillate had been removed there was added 100 parts of a suitable hydrocarbon vehicle and 100 parts of acetone to yield the finished product having the desired viscosity.

INTERMEDIATE EXAMPLE III

In a suitable reaction vessel provided with a means for removal of any aqueous distillate which forms 225 parts oleic acid, 225 parts abietic acid and 900 parts triethanolamine were heated to 250 degrees C. for 12 hours. An aqueous distillate was removed in accordance with the following log:

| Time | Temperature °C. | Parts Aqueous Distillate |
|---|---|---|
| 10:50 | 178 | Began |
| 11:55 | 250 | 64 |
| 12:30 | 251 | 127 |
| 3:00 | 250 | 185 |
| 5:00 | 250 | 223 |
| 11:45 | 250 | 260 |

To the above product there was added 500 parts of a suitable hydrocarbon vehicle to yield the finished product having a suitable viscosity.

INTERMEDIATE EXAMPLE IV

In a suitable reaction vessel provided with a means for removal of any aqueous distillate which forms, 500 parts of tall oil and 750 parts of tri-isopropanolamine were mixed with stirring to 250 degrees C. and held at that point for 12 hours. During the course of heating an aqueous distillate formed and was collected as per the following log:

| Time | Temperature °C. | Parts Aqueous Distillate |
|---|---|---|
| 10:30 | 130 | 6.5 |
| 11:45 | 250 | 63 |
| 3:30 | 250 | 100 |
| 11:45 | 250 | 137 |

To this product there was added 500 parts of a suitable hydrocarbon vehicle to yield the final composition.

Example I

In a suitable reaction vessel, 1,000 parts of Intermediate Example I and 222 parts of phthalic anhydride were condensed with stirring for 6 hours at 185 degrees C. During the progress of this reaction there was no elimination of any aqueous distillate. After completion of the condensation, the reaction mass was exceedingly viscous and it was necessary to add 700 parts of a suitable hydrocarbon fraction such as $SO_2$ Extract to yield a product having the desired fluidity.

Example II

In a suitable reaction vessel, 1,000 parts of Intermediate Example II, 200 parts of a suitable hydrocarbon fraction and 111 parts of phthalic anhydride were mixed with stirring and condensed for 2 hours at 165 degrees C. The application of continued heat at this stage results in the product gelling which is to be avoided. After cooling an additional 300 parts of a suitable hydrocarbon fraction such as $SO_2$ Extract was added to yield the completed product.

Example III

In a suitable reaction vessel, 1,000 parts of Intermediate Example III, 300 parts of a suitable hydrocarbon fraction and 75 parts of maleic anhydride were heated with stirring for 30 minutes at 60 degrees C. The resulting product had satisfactory physical characteristics. Additional experiments indicated that the use of either higher temperatures of condensation or longer periods of condensation resulted in gelation. The resultant gels, although suitable for some purposes, did not have satisfactory physical characteristics for use as demulsifiers.

Example IV

In a suitable reaction vessel, 1,000 parts of Intermediate Example IV, 300 parts of a suitable hydrocarbon fraction, and 160 parts of phthalic anhydride were condensed for 2 hours at 165 degrees C.

Example V

In a suitable reaction vessel, 1,000 parts of Intermediate Example IV, 50 parts of phthalic anhydride and 300 parts of a suitable hydrocarbon fraction were condensed with stirring for 2 hours at 155 degrees C.

The above examples are only a few of the many products which may be prepared according to the principles disclosed in the foregoing discussion. Various examples of the many products which answer the description herein made are contemplated; some may be oil soluble and others water soluble, and in many instances they may possess dual solubility to an appreciable extent. The suitability of any of the products for the breaking and resolving of any given emulsion or for other uses can readily be determined by conventional procedures. The products may be used as such for resolving emulsions of the water-in-oil type, or they may be admixed with other demulsifying reagents in varying ratios as required by the problem at hand.

The temperatures employed in preparing the intermediate acylation reaction product should be sufficiently high to facilitate the elimination of water from the reaction mixture by distillation. The heating should preferably be stopped short of incipient gelation unless a gelled product is desired for a particular purpose. The preferred temperature range during the intermediate acylation step is from 125 degrees C. to 300 degrees C. Especially good results have been obtained by completing the intermediate acylation step at temperatures within the range of 250 degrees C. to 260 degrees C.

The temperature employed in the subsequent reaction between the intermediate acylated product and the polybasic acid or acid anhydride should be sufficient to cause the formation of a partial ester and will vary somewhat depending upon the type of polybasic acid or acid anhydride, but good results have been obtained in the temperature range from 50 degrees C. to 200 degrees C.

The suitable hydrocarbon vehicle referred to in the examples is sulfur dioxide ($SO_2$) extract. This material is a by-product from the Edeleanu process of refining petroleum in which the undesirable fractions are removed by extraction with liquid sulfur dioxide. After removal of the sulfur dioxide, a mixture of hydrocarbons, substantially aromatic in character, remains which is designated in the trade as $SO_2$ Extract. Examples of other suitable hydrocarbon vehicles are toluene, xylene, gas oil, diesel fuel, bunker fuel and coal tar solvents.

The improved demulsifying reagents prepared in accordance with the present invention are preferably used in the proportion of one part of reagent to from 2,000 to 30,000 parts of emulsion either by adding the concentrated product directly to the emulsion or after diluting with a suitable vehicle in the customary manner.

The intermediate products disclosed herein are claimed in my co-pending application Serial No. 66,833, filed December 22, 1948, now abandoned.

The invention is hereby claimed as follows:

1. A condensation reaction product of an organic compound from the group consisting of organic polycarboxy acids and their anhydrides and an intermediate molecularly dehydrated acylated derivative of an alkanolamine wherein the acylating radicals comprise two dissimilar monocarboxy acids, one being an unsaturated long chain acyclic type monocarboxy acid containing at least 8 and not more than 32 carbon atoms in the chain and the other being an unsaturated resin type monocarboxy acid, the alkanolamine being employed in 100 to 600 per cent molar excess in the intermediate acylation reaction.

2. The product of the reaction between: (a) a molecularly dehydrated acylated alkanolmine where said alkanolamine is employed in 100 to 600 per cent molar excess, and the acylating agent is a mixture of at least two dissimilar, unsaturated monocarboxy acids wherein at least one of said acids is a carbocyclic resin acid and another of said acids is a fatty acid having at least 8 and not more than 32 carbon atoms in the chain, the quantity of water eliminated by said molecular dehydration being at least 200% of the quantity formed by theoretically complete acylation of the carboxy groups of said carboxy acids, and (b) a polycarboxy organic acid.

3. The product of the reaction between: (a) an intermediate molecularly dehydrated acylated tertiary alkanolamine having three hydroxyl groups, said alkanolamine being employed in 100 to 600 per cent molar excess and the acylating agent being a mixture of at least two dissimilar, unsaturated monocarboxy acids wherein at least one of said acids is a carbocyclic resin acid, and another of said acids is a fatty acid having at least 8 and not more than 32 carbon atoms in the chain, the quantity of water eliminated by said molecular dehydration being at least 200% of the quantity formed by theoretically complete acylation of the carboxy groups of said carboxy acids, and (b) a polycarboxy organic acid.

4. The product of the reaction between: (a) an intermediate molecularly dehydrated acylated triethanolamine, said triethanolamine being employed in 100 to 600 per cent molar excess and the acylating agent being a mixture of at least two dissimilar, unsaturated monocarboxy acids wherein at least one of said acids is a carbocyclic resin acid and another of said acids is a fatty acid having at least 8 and not more than 32 carbon atoms in the chain, the quantity of water eliminated by said molecular dehydration being at least 200% of the quantity formed by theoretically complete acylation of the carboxy groups of said carboxy acids, and (b) a polycarboxy organic acid.

5. The product of the reaction between; (a) a molecularly dehydrated acylated triethanolamine, where said triethanolamine is present in 100 to 600 per cent molar excess, and the acylating agent is tall oil, the quantity of water eliminated by said molecular dehydration being at least 200% of the quantity formed by theoretically complete acylation of the carboxy groups of the carboxy acids present in the tall oil and (b) a polycarboxy organic acid.

6. The product of the reaction between: (a) a molecularly dehydrated acylated triethanolamine, where said triethanolamine is present in 100 to 600 per cent molar excess, and the acylating agent is tall oil, the quantity of water eliminated by said molecular dehydration being at least 200% of the quantity formed by theoretically complete acylation of the carboxy groups of the carboxy acids present in the tall oil and (b) phthalic anhydride.

7. The product of the reaction between: (a) an intermediate molecularly dehydrated acylated alkanolamine formed by heating an alkanolamine at temperatures within the range of 125 degrees C. to 300 degrees C. with two dissimilar monocarboxy acids, one being an unsaturated long chain acyclic monocarboxy acid containing at least 8 and not more than 32 carbon atoms in the chain and the other being an unsaturated carbocyclic resin type monocarboxy acid, in proportions corresponding to a molar excess of the alkanolamine over said carboxy acids in the range of 100% to 600% with the removal of water from the product in an amount equivalent to 200% to 600% of the quantity theoretically formed by complete acylation of the carboxy groups of said carboxy acids, and (b) a polycarboxy organic compound from the group consisting of polycarboxy organic acids and their anhydrides, the reaction between the intermediate molecularly dehydrated acid alkanolamine and said polycarboxy organic compound being effected at temperatures within the range of 50 degrees C. to 200 degrees C. until the carboxyl groups of said polycarboxy organic compound are at least partially esterified.

8. The product of the reaction between: (a) an intermediate molecularly dehydrated acylated triethanolamine made by heating tall oil with an alkanolamine comprising essentially triethanolamine at temperatures within the range of 125 degrees C. to 300 degrees C. in proportions corresponding to a molar excess of triethanolamine over the carboxy acids of said tall oil in the range of 100% to 600% with the removal of water from the product in an amount equivalent to 200% to 600% of the quantity theoretically formed by complete acylation of the carboxy groups of the carboxy acids in said tall oil, and (b) phthalic anhydride, the reaction between the intermediate molecularly dehydrated acylated triethanolamine and the phthalic anhydride being effected at temperatures within the range of 50 degrees C. to 200 degrees C. and said reaction being carried out until the carboxyl groups in the phthalic anhydride are at least partially esterified.

WILLARD H. KIRKPATRICK.

REFERENCES CITED

The following references are of record in the file of this patent:

UNITED STATES PATENTS

| Number | Name | Date |
|---|---|---|
| 2,089,212 | Kritchevsky | Aug. 26, 1937 |
| 2,096,749 | Kritchevsky | Oct. 26, 1937 |
| 2,192,664 | Kritchevsky | Mar. 5, 1940 |
| 2,305,083 | Jayne | Dec. 15, 1942 |
| 2,429,445 | Young | Oct. 21, 1947 |
| 2,470,829 | Monson | May 24, 1949 |